United States Patent [19]

Honmou

[11] Patent Number: 5,662,817

[45] Date of Patent: Sep. 2, 1997

[54] METHOD FOR FORMING TIP OF ARRAY OPTICAL FIBER USING ETCHING PROCESS

[75] Inventor: Hiroshi Honmou, Tokyo, Japan

[73] Assignee: NEC Corporation, Tokyo, Japan

[21] Appl. No.: 492,574

[22] Filed: Jun. 20, 1995

[30] Foreign Application Priority Data

Jun. 28, 1994 [JP] Japan ................................ 6-146343
Dec. 27, 1994 [JP] Japan ................................ 6-324568

[51] Int. Cl.$^6$ ........................... B05D 1/00; C03C 25/00
[52] U.S. Cl. ..................... 216/24; 216/49; 216/46; 216/52; 216/74; 65/31
[58] Field of Search ....................... 216/11, 74, 46, 216/24, 52, 49; 65/31

[56] References Cited

U.S. PATENT DOCUMENTS

| 5,100,507 | 3/1992 | Cholewa et al. | ................ | 216/11 X |
| 5,290,398 | 3/1994 | Feldman et al. | ................ | 216/11 |
| 5,531,343 | 7/1996 | Filas et al. | ................ | 216/11 |

FOREIGN PATENT DOCUMENTS 5-224098  9/1993  Japan .

OTHER PUBLICATIONS

"Put–in Micro–connectors for Alignment–Free Coupling of Optical Fiber Arrays" by A. Sasaki et al., *Fourth Optoelectronics Conference (OEC'92) Technical Digest*, pp. 136–137, Jul. 1992.

*Primary Examiner*—Thi Dang
*Attorney, Agent, or Firm*—Young & Thompson

[57] ABSTRACT

The method for forming a tip of an array optical fiber disclosed is one in which an etching resistive material such as a photoresist is applied first on an end portion of a coated material covering constituent fibers of the array optical fiber, and then the ends of the constituent fibers are etched. Due to the presence of the etching resistive material, the etching solution does not dissolve the coated material. In an alternative method, the etching resistive material such as a photoresist is applied on a side surface of a tip portion of each constituent fiber of the array optical fiber exposed from the coated material, the tip portion is cut and flattened together with the etching resistive material, and the end faces of the constituent optical fibers are etched. The presence of the etching resistive material prevents the tip diameter of the constituent optical fiber from becoming small.

7 Claims, 3 Drawing Sheets ded with the protective material, the dissolution

METHOD FOR FORMING TIP OF ARRAY OPTICAL FIBER USING ETCHING PROCESS

BACKGROUND OF THE INVENTION (1) Field of the Invention

The present invention relates to a method for forming an array of optical fibers for optical communication, and more particularly to a method for forming an array of optical fibers having a tip capable of being efficiently optically coupled with an optical element.

(2) Description of the Related Art

A conventional optical fiber intended to be capable of being efficiently coupled with an optical element has a spherical tip but the spherical tip is limited to a core part of the tip only. In such a conventional optical fiber, the tip of the core exposed by etching is heated and is made spherical. This is advantageous especially when arrays of optical fibers to be optically coupled respectively with a plurality of optical elements are manufactured since a number of the optical fibers arranged in array form can be subjected to simultaneous heat treatment for making them spherical with a low manufacturing cost. This method is disclosed in Japanese Patent Application No. Hei 4-35, published as Patent Application Kokai Publication No. Hei 5-224098 (Optical coupling circuit and manufacture thereof).

Also, there is a conventional optical fiber in which, in an opposite arrangement to the above explained conventional optical fiber, the core at the tip has a recess (jack). A protuberance (plug) formed in an optical coupling lens is inserted into the recess (jack). Similarly as in the first mentioned conventional example, the recess is made by etching the core of the fiber. This method is disclosed in a paper entitled "Put-in Micro-connecters for Alignment-Free Coupling of Optical Fiber Arrays" by A. Sasaki et al, presented at Fourth Optoelectronics Conference (OEC'92) Technical Digest, pp. 136–137, July 1992.

In the optical fiber in general, a resin-made coating material is used to cover and protect a fiber made of glass. However, in the process of etching an end face of the fiber, the etching solution tends to enter into the coating material of the fiber. This causes the coating material to dissolve, makes it difficult to protect the fiber and lowers the reliability of the optical fiber. Especially, in the case of an array of optical fibers which includes a plurality of constituent optical fibers covered by the protective material, the dissolution of the coating material develops, resulting in difficulties in protecting the fibers inside the coating material, and in the occurrence of irregular orientations of tip ends of the fibers, uneven lengths of the projected portions of ends of the fibers and uneven positions of tip ends of the fiber. The problem which results therefrom is that the optical coupling efficiency between the optical elements and respective fibers becomes unsecured gives rise to difficulties in obtaining the desired optical coupling characteristics.

Also, generally, the optical fiber is placed along a groove in a V-shape in cross section and is fixed by being sandwiched between the groove and a flat substrate. However, in the process of etching in order to make the core tip spherical, not only the end face of the fiber but also an adjacent side portion is also etched, so that the fiber tip diameter becomes reduced. This requires that the depth of the V-shaped groove which holds the fiber be changed according to each set of the conditions for the fiber etching. Thus, the problem is that the fixing jig for this purpose becomes costly, thus increasing the manufacturing cost for optical fibers.

SUMMARY OF THE INVENTION

An object of the present invention, therefore, is to overcome the problems existing in the prior art and to provide a method for forming a tip of an array of optical fibers capable of being efficiently optically coupled with an optical element.

According to a first aspect of the invention, there is provided a method for forming a tip of an array of optical fibers using an etching process, the method comprising the steps of:

applying first an etching resistive material on an end portion of a coated material covering constituent optical fibers of the array of optical fibers; and then etching the tip of the array of optical fibers such that the coated material is prevented from being dissolved by a etching solution.

In the step of applying the coating material, an etching resistive material such as a photoresist may be applied on end portion of the coating material. Also, in the etching step, the end faces of a plurality of constituent optical fibers may be simultaneously etched.

According to a second aspect of the invention, there is provided a method for forming a tip of an optical fiber using an etching process, the method comprising the steps of:

applying on a side surface of a tip portion of each constituent fiber of the array of optical fibers a coating material having an etching resistivity;

flattening an end face of the constituent fiber by cutting the tip portion; and etching the end face of the constituent fiber such that the side surface of the tip portion of each constituent fiber is prevented from being eroded by an etching solution.

As the coating material, use may be made of a photoresist or a protective coating material as coated on the array of optical fibers. Also, the end faces of a plurality of constituent optical fiber may be simultaneously etched.

An outer surface of the coated material covering the optical fibers is processed for chemical resistance, but the end of the coated material is exposed and is normally not subjected to such process. Thus, during the etching process, the etching solution enters into and erodes the end of the coated material. According to the first aspect of the invention, since the coating material having an etching resistivity is applied on the end portion of the coated material and is hardened thereon before the etching takes place, the entry of the etching solution into the coated material can be prevented. This ensures the prevention of the dissolution of the coated material, of the lowering of the fiber reliability, and the occurrence of non-uniformity of the tips of optical fibers.

According to the second aspect of the invention, since the coating material is applied to sides of the constituent optical fibers, the erosion due to the etching solution that enters into and erodes the sides of the fibers is prevented during the etching process of the ends of the fibers. In this way, it is possible not only to prevent the etching solution from causing the erosion problem but also to prevent the diameter of the fibers from becoming smaller.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Now, preferred embodiments of the invention are explained with reference to the drawings.

Figure 1A:
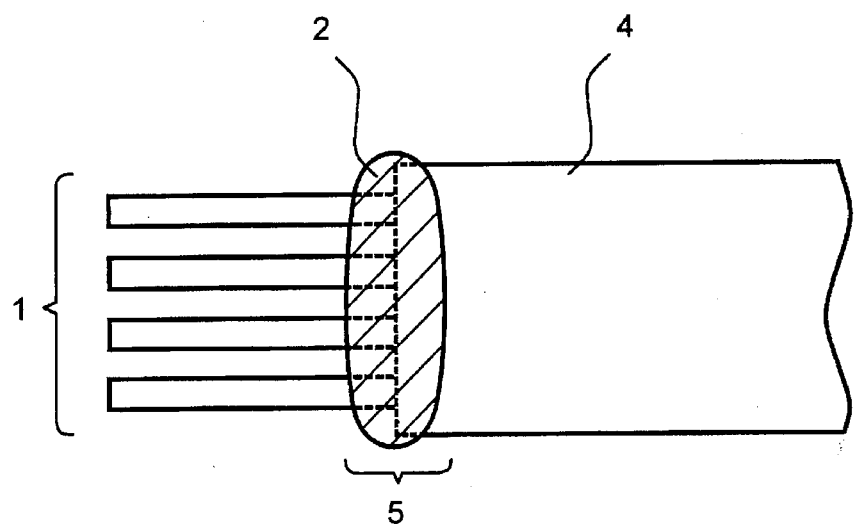
FIGS. 1A and 1B are schematics of a portion of the array optical fiber for explaining a method for forming a tip of the array of optical fibers of a first embodiment according to the invention.
Figure 1B:
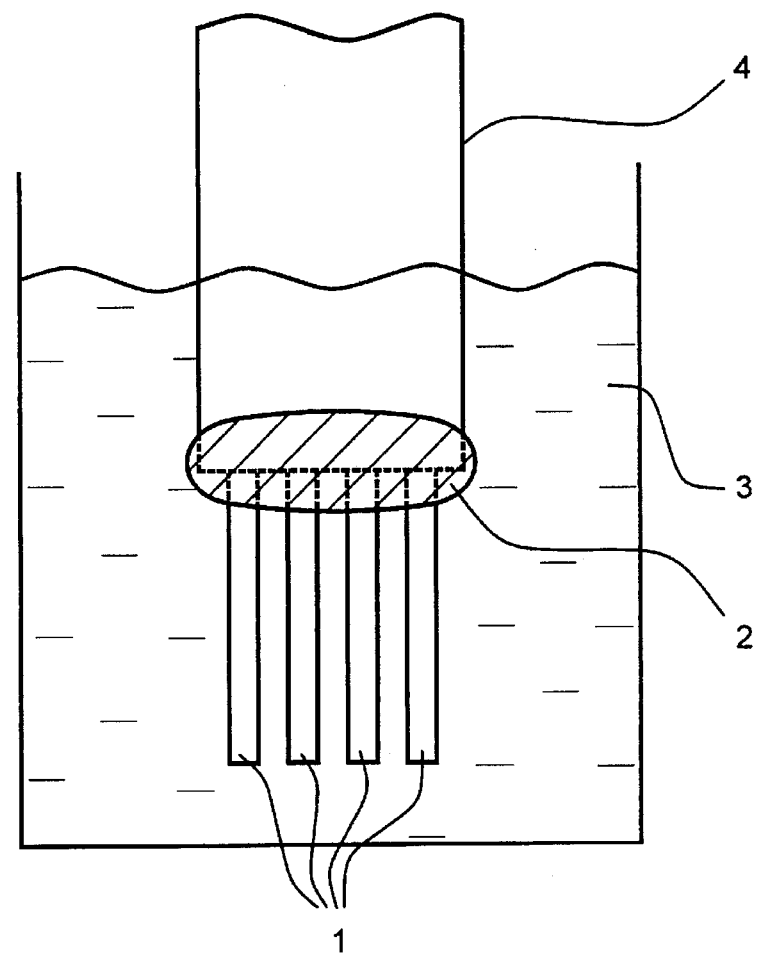

FIGS. 1A and 1B diagrammatically show an array of optical fibers being processed for explaining the method for forming tip of the array optical fiber of the first embodiment.

First, after a coated material 4 is removed from an end portion of a 4-channel array of optical fibers, a photoresist 2 which is etching resistive is applied to an end portion 5 of the remaining coated material 4 (FIG. 1A). Each of the constituent optical fibers is a single mode fiber having an outer diameter of 125 μm and a core diameter of 10 μm. The photoresist 2 is an acid resistive photoresist of the type that is generally used as a mask material for an ultraviolet exposure process.

Next, the structure being processed as above is hardened at 90° C. for one hour, and then the end face of the array optical fiber 1 is etched using a mixed solution 3 composed of hydrofluoric acid and ammonium fluoride (FIG. 1B). At this time, due to the presence of the etching resistive and acid resistive resist 2 on the end portion of the coating material 4 on the side surfaces of the constituent fibers of the array optical fiber 1, there is no possibility for the etching solution 3 to enter into the coated material 4. Thus, it is possible to prevent the dissolution of the coating material 4, thereby preventing the lowering of quality and reliability of the fibers and the uneven alignment of the tips of the fibers. The photoresist 2 may remain in place for protecting the fiber after the etching process but, if chosen to be removed, it may be easily removed by using an organic solvent. In this embodiment, the array of optical fibers 1 in which ends of the constituent fibers are well aligned along a common plane has been obtained, and the application thereof has shown that the optical coupling with a semiconductor laser is so excellent that optical coupling loss variations among the fibers are 0.4 dB at the maximum.

The process according to this embodiment can be applied to a step of etching the optical fiber end face whereby the core at the end face of the fiber is formed in spherical or recessed configuration.

In this embodiment, a photoresist is used as an etching resistive material that is applied at the end portion of the coated material, but this is not limited thereto since it may be, for example, a resist for electron beams or an ultraviolet hardening resin. Any material will be acceptable if it is an etching resistive material.

Now, a second embodiment of the invention is explained with reference to FIGS. 2A to 2C, which diagrammatically show an array of optical fibers and which figures are used for explaining a method for forming a tip of the array of optical fibers of the second embodiment.

Figure 2A:
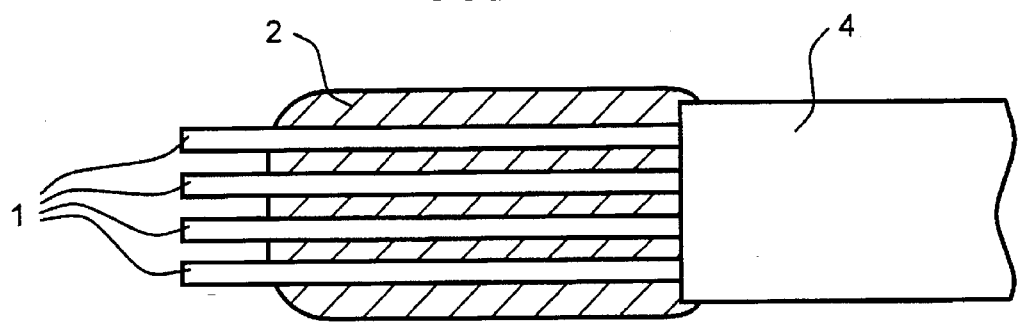
FIGS. 2A to 2C are schematics of a portion of the array optical fiber for explaining a method for forming a tip of the array of optical fibers of a second embodiment according to the invention.
Figure 2B:
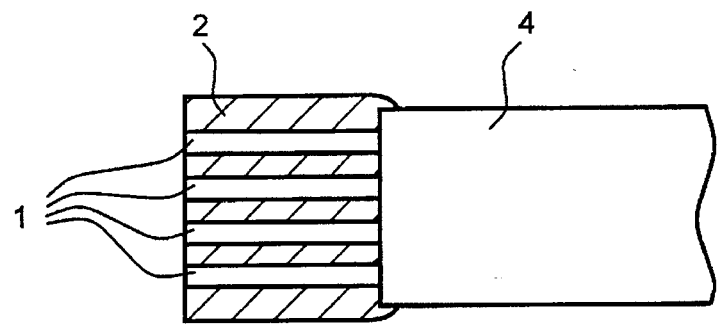

A coating material 4 which covers an array of optical fibers 1 is partly removed so that the 4-channel array optical fibers 1 at one end is exposed, and an etching resistive photoresist 2 is applied to the exposed side surface of the optical array of fibers 1 (FIG. 2A). The array optical fibers 1 is a silica glass made single mode fiber having an outer diameter of 125 μm and a core diameter of 10 μm, and the resist 2 is an acid resistive photoresist of the kind which is generally used as a mask material for an ultraviolet exposure process.

Next, the structure being processed is hardened at 90° C. for one hour. Then, the end portion of the array optical fibers 1 is cut together with the resist 2 so that the end face thereof becomes flat (FIG. 2B). This cutting and flattening may be carried out by using a commercially available fiber cutter, dicing saw, etc.

Figure 2C:
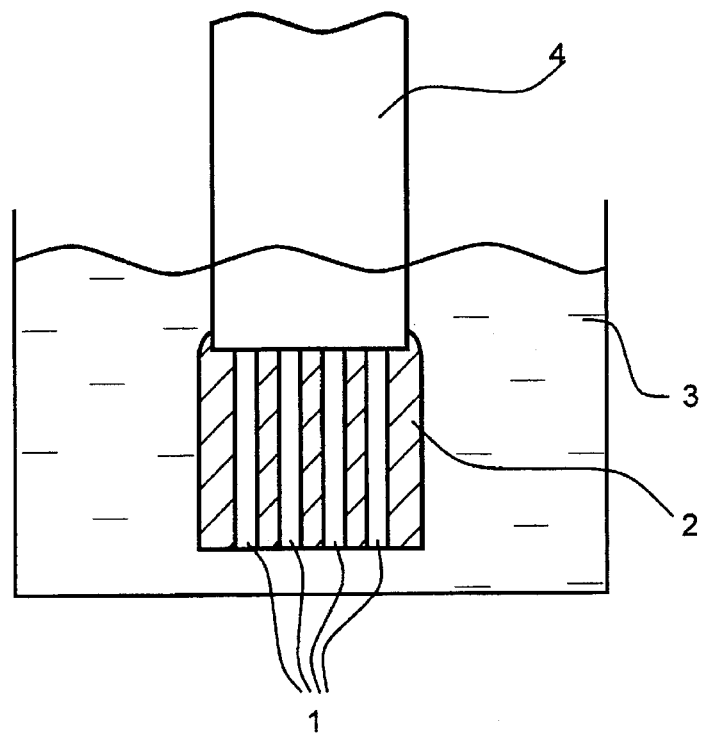

Subsequently, the tip of the array optical fiber 1 is immersed in the etching solution 3 composed of a mixture of hydrofluoric acid and ammonium fluoride followed by etching (FIG. 2C). At this time, due to the presence of the etching resistive and acid resistive resist 2 on the side surface of each of the constituent fibers of the array optical fiber 1, there is no possibility for the etching solution 3 to erode the side surface of the constituent optical fiber. Thus, it is possible to prevent the fiber from becoming smaller in its end portion diameter. The photoresist 2 may remain in place for the protection of the fiber after the etching process but, if chosen to be removed, it may be easily removed by using an organic solvent. In this embodiment, the optical fiber with an excellent etching result has been obtained, with the diameter being 125 μm which is the same diameter as that before the etching.

Figure 3A:
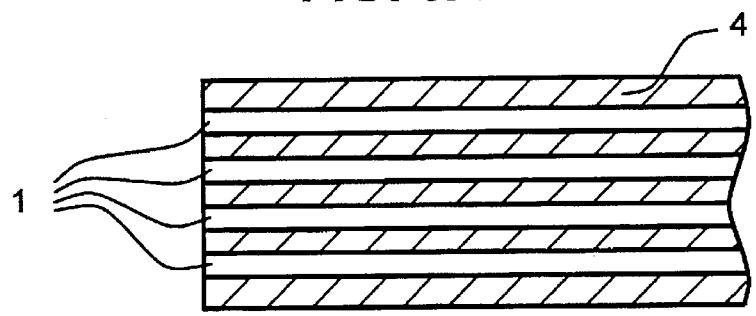
FIGS. 3A to 3C are schematics of a portion of the array optical fiber for explaining a method for forming a tip of the array of optical fibers of a third embodiment according to the invention.
Figure 3B:
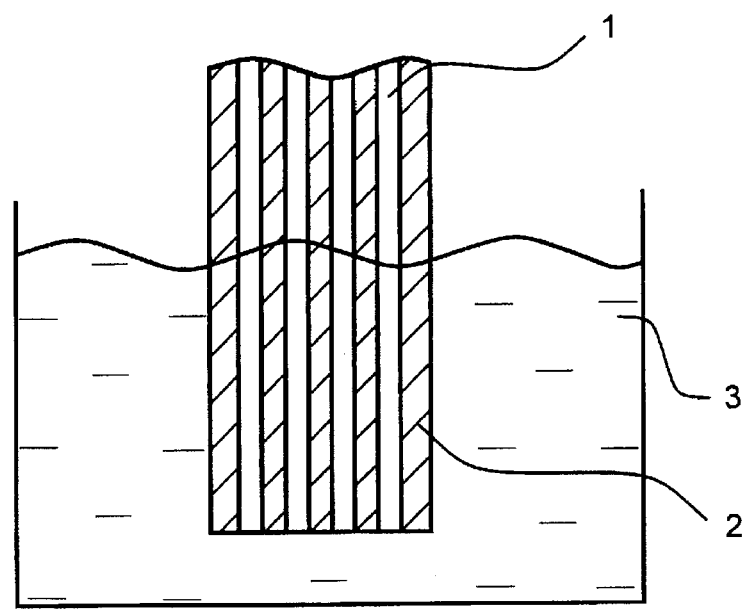
Figure 3C:
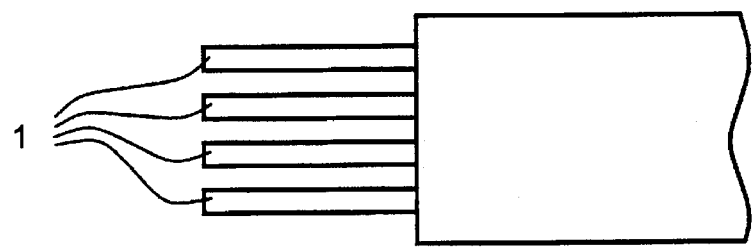

FIGS. 3A, 3B and 3C are diagrams of an array optical fiber for use in explaining a method for forming a tip of the array of optical fibers of a third embodiment according to the invention.

First, the end face portion of the 4-channel optical array fiber 1 covered by a protective coating material 4 is flattened using a dicing saw (FIG. 3A). The quality and size of the optical fiber 1 are the same as those in the second embodiment. The coating material 4 may be of, for example, ultraviolet hardening resin, nylon, etc. Next, the end surface of the array of optical fibers 1 flattened is etched using a mixed solution 3 composed of hydrofluoric acid and ammonium fluoride followed by etching (FIG. 3B and FIG. 3C). At this time, due to the presence of the coating material 4 on the side surface of the constituent fiber of the array optical fiber 1, there is no possibility for the etching solution 3 to erode the side surface of the optical fiber. Thus, it is possible to prevent the optical fiber from becoming smaller in its end portion diameter. Next, about 10 mm of the coating material 4 at the end portion is removed using an appropriate removal tool (FIG. 3C). In this embodiment, the optical fiber with an excellent etching result has been obtained, with the diameter being 125 μm which is the same diameter as that before the etching.

The second and third embodiments employ a photoresist as a coating material that is provided to the end portion of the array optical fiber for the etching process, but this is not limited thereto since it may be, for example, a resist for electron beams or a silicone resin. Any material will serve the purpose if it is an etching resistive material.

According to the second and third embodiments, since the end face of each of the constituent optical fibers is etched after the provision of the coating material at the end portion of the optical fiber, only this end face of the optical fiber is etched, and this prevents the diameter at the end portion thereof from becoming small and enables to etch the end face of the optical fiber at a reduced cost.

The process of etching the optical fiber end face in each of the above three embodiments may be applied to the step where the core at the end face of the fiber is formed in a protruded or a recessed configuration.

Further, although each of the three embodiments employs a single mode fiber, it can be applied to an optical fiber in which the fiber is a focussed multi-mode fiber with the core dopant concentration being of a focussed type distribution.

Further, in each of the three embodiments, the etching solution employs a mixed solution of hydrofluoric acid and ammonium fluoride, but the solutions are not limited to only these types of etchants, and a hydrofluoric acid solution or a solution of a hot alkaline type may be used. That is, any etchant will be acceptable if it can etch the silica glass which is a material of the optical fiber.

Also, in all of the above embodiments, the array of optical fibers 1 is shown as having four channels. This may well be with a single channel, two or three channels, or with a larger number of channels.

While the invention has been described in its preferred embodiments, it is to be understood that the words which have been used are words of description rather than limitation and that changes within the purview of the appended claims may be made without departing from the true scope spirit of the invention as defined by the claims.

What is claimed is:

1. A method for forming a tip of an array of optical fibers using an etching process, said method comprising the steps of:

applying, before an etching step, an etching resistive material on an end portion of a coated material covering constituent optical fibers of the array of optical fibers such that said etching resistive material extends to ends of said optical fibers; and then etching, in an etching solution, said tip of the array optical fiber such that said coated material is prevented from being dissolved by the etching solution, an outer diameter of each of said optical fibers remaining substantially unchanged.

2. The method for forming a tip of an array of optical fibers using an etching process according to claim 1, wherein said etching resistive material is a photoresist.

3. The method for forming a tip of an array of optical fibers using an etching process according to claim 1, wherein in said etching step, end faces of a plurality of said constituent optical fibers are simultaneously etched.

4. A method for forming a tip of an array of optical fibers using an etching process, said method comprising the steps of:

applying, before an etching step, on a side surface of a tip portion of each constituent fiber of the array of optical fibers a coating material having an etching resistivity;

flattening an end face of each said constituent fiber by cutting said tip portion, said coating material extending to tips of said cut optical fibers; and etching, in an etching solution, said end face of each said constituent fiber such that said side surface of the tip portion of each constituent fiber is prevented from being eroded by said etching solution, an outer diameter of each of said optical fibers remaining substantially unchanged.

5. The method for forming a tip of an optical fiber using an etching process according to claim 4, wherein said coating material is a photoresist.

6. The method for forming a tip of an array of optical fibers using an etching process according to claim 4, wherein said coating material applied to said tip portion is a same material as a material that covers remaining portions of said array of optical fibers.

7. The method for forming a tip of an array of optical fibers using an etching process according to claim 4, wherein, in said etching step, end faces of a plurality of optical fibers forming said array of optical fiber are simultaneously etched.

* * * * *